United States Patent
Nguyen et al.

(10) Patent No.: US 7,437,511 B1
(45) Date of Patent: Oct. 14, 2008

(54) SECONDARY LEVEL CACHE FOR STORAGE AREA NETWORKS

(75) Inventors: Thai Nguyen, Thornton, CO (US); Michael L. Leonhardt, Longmont, CO (US); Richard John Defouw, Boulder, CO (US)

(73) Assignee: Storage Technology Corporation, Louisvile, CO (US)

( * ) Notice: Subject to any disclaimer, the term of this patent is extended or adjusted under 35 U.S.C. 154(b) by 241 days.

(21) Appl. No.: 11/334,127

(22) Filed: Jan. 18, 2006

Related U.S. Application Data

(62) Division of application No. 10/609,879, filed on Jun. 30, 2003, now abandoned.

(51) Int. Cl.
G06F 12/08 (2006.01)
(52) U.S. Cl. .......................... 711/120; 711/168; 710/32
(58) Field of Classification Search ................. 711/120, 711/168; 710/32
See application file for complete search history.

(56) References Cited

U.S. PATENT DOCUMENTS

| | | | |
|---|---|---|---|
| 5,307,477 A | 4/1994 | Taylor et al. | |
| 5,386,547 A | 1/1995 | Jouppi | |
| 5,581,736 A | 12/1996 | Smith | |
| 5,829,024 A | 10/1998 | Sato | |
| 5,875,462 A * | 2/1999 | Bauman et al. | 711/119 |
| 6,006,309 A | 12/1999 | Shelly et al. | |
| 2002/0056025 A1 | 5/2002 | Qiu et al. | |
| 2002/0078299 A1 | 6/2002 | Chiou et al. | |
| 2003/0033497 A1 | 2/2003 | Blades et al. | |
| 2003/0070044 A1 * | 4/2003 | Jeddeloh | 711/118 |
| 2004/0123045 A1 | 6/2004 | Hum et al. | |

* cited by examiner

Primary Examiner—Kevin Ellis
Assistant Examiner—Jared I Rutz
(74) Attorney, Agent, or Firm—Brooks Kushman P.C.

(57) ABSTRACT

For use in a storage area network (SAN), a virtualization layer including at least one virtual engine having a respective local cache and a secondary cache layer, wherein the secondary cache layer includes the local caches coupled together, the local caches individually including a first cache layer, and at least one of a data transfer command and data corresponding to the transfer command are multicast to the secondary cache layer through an interconnection bus, the interconnection bus coupling the at least one virtual engine and at least one physical storage device.

15 Claims, 5 Drawing Sheets

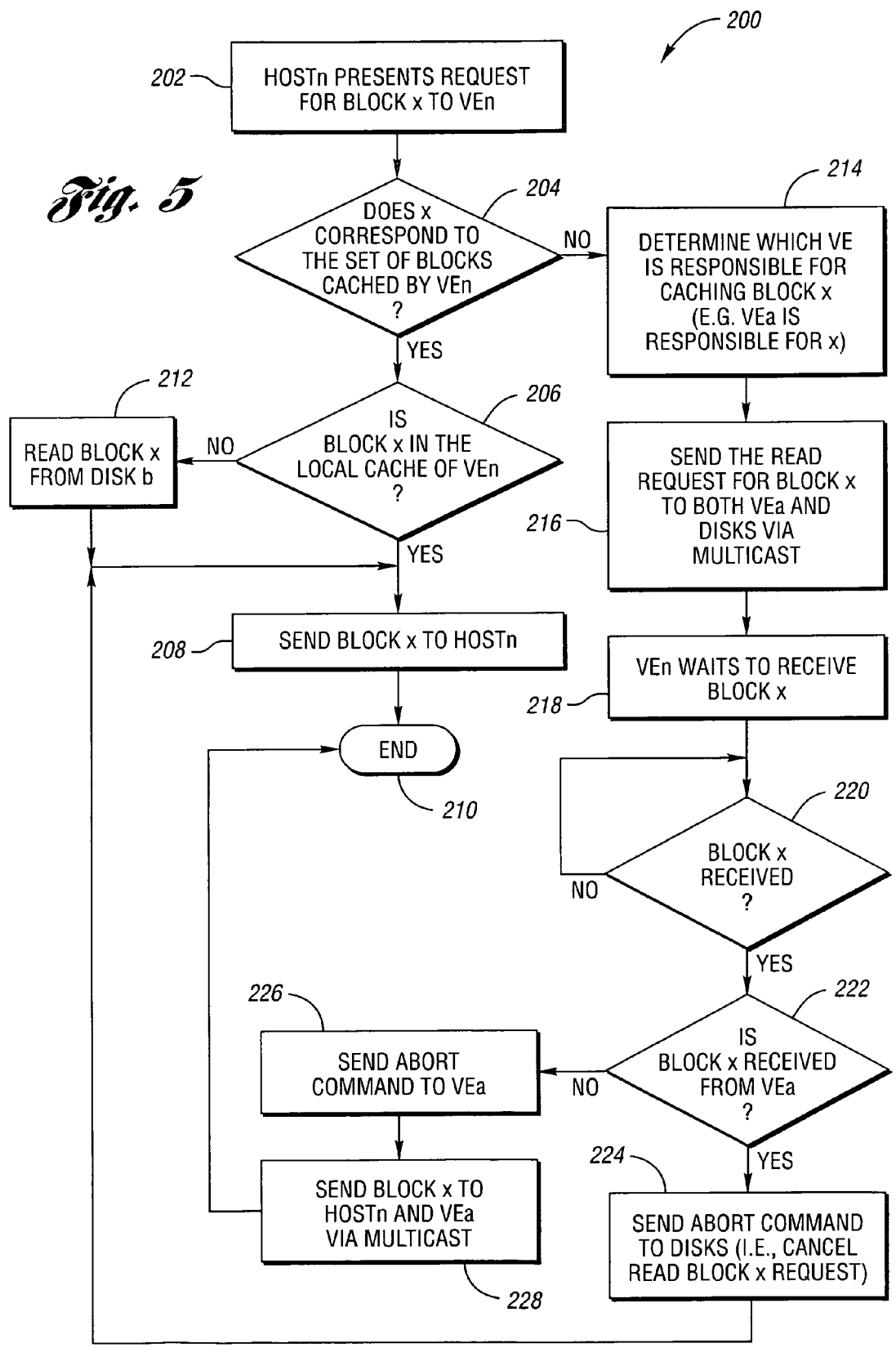

SECONDARY LEVEL CACHE FOR STORAGE AREA NETWORKS

CROSS-REFERENCE TO RELATED APPLICATIONS

This is a divisional application of application Ser. No. 10/609,879, filed on Jun. 30, 2003 now abandoned, which is hereby incorporated by reference in its entirety.

BACKGROUND OF THE INVENTION

1. Field of the Invention

The present invention relates to a system and a method for a secondary level cache for storage area networks.

2. Background Art

A storage area network (SAN) is a network that interconnects data storage devices with respective user host computers that are usually configured as servers. SANs usually include tasks or operations such as disk mirroring, data backup and restore operations, archival and retrieval operations, data migration between storage devices, and data sharing.

Referring to FIG. 1, a diagram illustrating an example of a conventional storage area network (SAN) 10 is shown. The SAN 10 includes a number of hosts 12a-12n coupled to a virtualization layer 14 through a bus 15. Each host 12 typically includes a local cache (not shown). The layer 14 includes a number of virtual data storage devices 16a-16n each of which is coupled to the bus 15. In some conventional SANs, the layer 14 or each virtual device 16 includes interface hardware, operational memory, a local cache, and a microcontroller (not shown). When a conventional SAN 10 is implemented having more than one local cache, each local cache is independent (i.e., not coupled to any other local cache). The layer 14 (i.e., the virtual devices 16) is coupled to a interconnection fabric/bus 18 using the virtual device 16 interface hardware. The fabric/bus 18 provides interconnections to a number of physical data storage disks 20a-20q. The number of virtual devices 16 can be but is not necessarily equal to the number of physical data storage devices (or disks) 20 (i.e., the number n may or may not equal the number q). The virtual disks that are implemented in the virtual devices 16 are implemented containing data (or information) from any of the physical devices 20 depending on what range of data blocks (i.e., a respective address block or range of address blocks) is defined in the respective virtual device 16.

In conventional storage area networks such as the SAN 10, when a write/read block request (or any other data transfer request) is made from a host 12 (e.g., host 12x, not shown), first the local cache (i.e., a single level cache located at the host 12x, the layer 14 or the respective virtual device 16x, not shown) is checked (i.e., interrogated, etc.) to determine if the data blocks that correspond to the request are within the cache. When the blocks that correspond to the request are not in the local (or single level) cache, the SAN 10 accesses and writes/reads the corresponding data to/from (i.e., transfers data to/from) the corresponding physical device 20 (e.g., a device 20y, not shown). Thus, when the SAN 10 accesses a physical device 20, there is an inherent delay in the SAN 10 due to the time interval required to first determine whether the blocks that correspond to the request are within the cache, and then access and perform the data transfer between the physical device 20 and the requesting host 12. As a result, when a host 12 performs an operation that accesses a physical device 20 additional latency is introduced and the overall performance of the SAN 10 is degraded.

Thus, there exists a need and an opportunity for a system and a method to improve SAN performance.

SUMMARY OF THE INVENTION

The present invention generally provides an improved method and an improved system for a storage area network (SAN). Such an improved SAN may implement a secondary level cache. The improved SAN may include at least one local cache as a first level cache. The improved SAN may multicast requests and data. Such an improvement can provide more rapid data transfer when performing at least one data transfer operation between a host and a physical device. Furthermore, the improved system and improved method for SAN implementation may provide presentation of requested data to a respective local cache as well as the host and thus provide more rapid subsequent data transfer operations involving the same data. The SAN system overall performance of the present invention may be improved when compared to conventional SAN implementations.

According to the present invention, for use in a storage area network (SAN), a virtualization layer is provided comprising at least one virtual engine having a respective local cache and a secondary cache layer. The secondary cache layer comprises the local caches coupled together, the local caches individually comprising a first cache layer, and at least one of a data transfer command and data corresponding to the transfer command are multicast to the secondary cache layer through an interconnection bus, the interconnection bus coupling the at least one virtual engine and at least one physical storage device.

Also according to the present invention, a storage area network (SAN) system is provided comprising at least one host computer, a virtualization layer, and at least one physical data storage device. The virtualization layer comprising at least one virtual engine having a respective local cache and corresponding to a respective one of the host computers. The at least one host computer is coupled to the virtualization layer, a secondary cache layer comprising the local caches coupled together, and the local caches individually comprising a first cache layer. The at least one physical data storage device is generally coupled to the virtualization layer through an interconnection bus, wherein a data transfer command presented by one of the host computers is multicast through the interconnection bus to the secondary cache and to the at least one physical storage device that corresponds to data corresponding to the command when the data corresponding to the command does not correspond to data stored in the local cache of the virtual engine that corresponds to the host computer that presented the command.

Further, according to the present invention, for use in a storage area network (SAN), a method of transferring data is provided. The method comprising presenting a data transfer command from at least one host computer to at least one virtual engine corresponding to a respective one of the host computers and having a local cache, providing a virtualization layer comprising a secondary cache layer and the at least one virtual engine, wherein the secondary cache layer comprises the local caches coupled together, and the local caches individually comprise a first cache layer, providing at least one physical data storage device coupled to the virtualization layer through an interconnection bus, and multicasting the command through the interconnection bus to the at least one virtual engine and to the at least one physical storage device that correspond to data corresponding to the command when the data corresponding to the command does not correspond to data stored in the local cache of the virtual engine that corresponds to the host computer that presented the command.

The above features, and other features and advantages of the present invention are readily apparent from the following detailed descriptions thereof when taken in connection with the accompanying drawings.

BRIEF DESCRIPTION OF THE DRAWINGS

FIG. 5 is a flow diagram of a data transfer operation of the present invention.

DETAILED DESCRIPTION OF THE PREFERRED EMBODIMENT(S)

With reference to the Figures, the preferred embodiments of the present invention will now be described in detail. Generally, the present invention provides a system and a method for an improved storage area network (SAN). Such an improved SAN may implement a secondary level cache. The improved SAN may include at least one local cache as a first level cache. The improved SAN may multicast requests and data. Such an improvement can provide more rapid data transfer when performing at least one data transfer operation between a host and a physical device. Furthermore, the improved system and improved method for SAN implementation may provide presentation of requested data to a respective local cache as well as the host and thus provide more rapid subsequent data transfer operations involving the same data. The SAN system overall performance of the present invention may be improved when compared to conventional SAN implementations.

Figure 1:
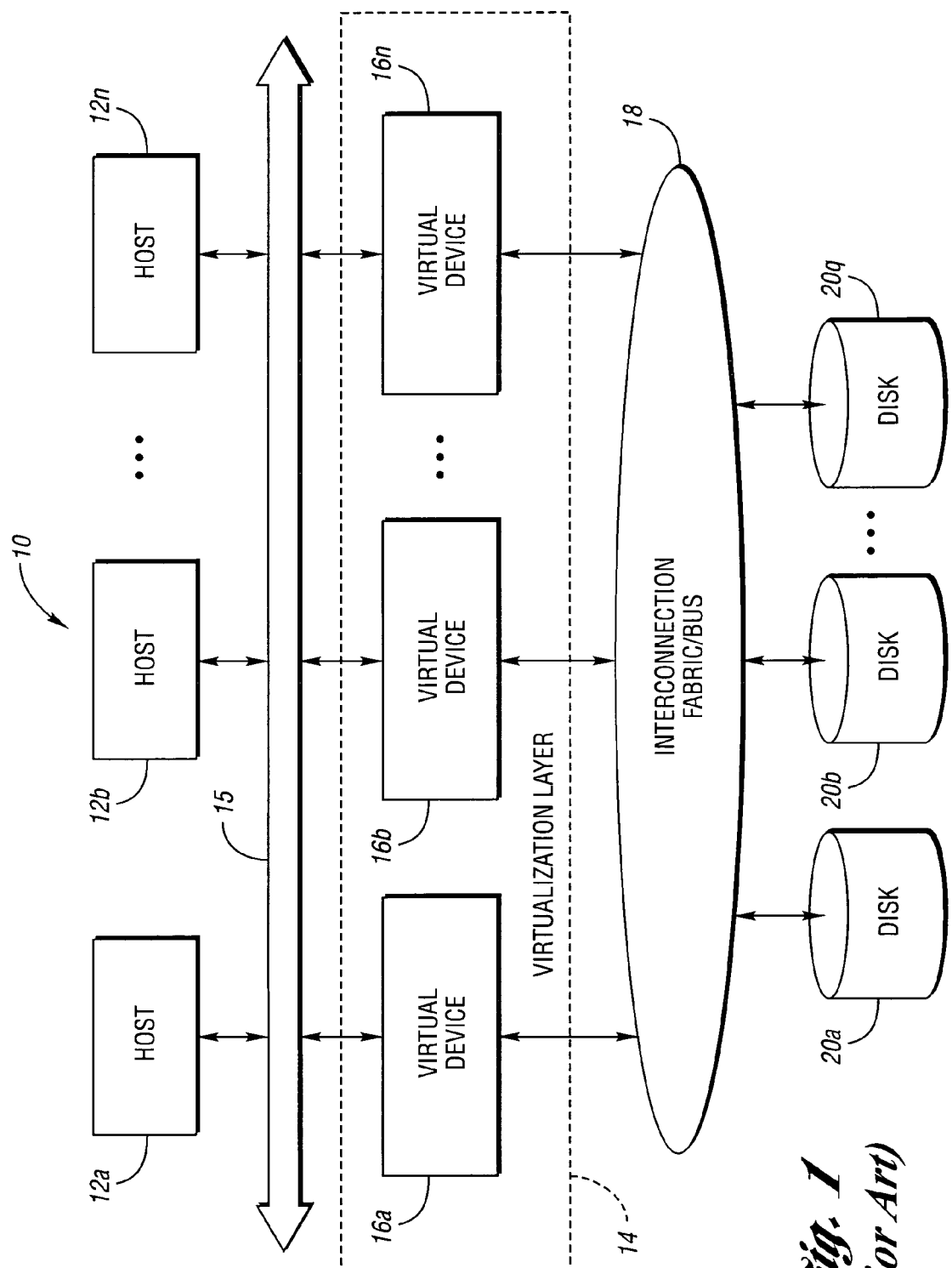
FIG. 1 is a diagram of a conventional storage area network.
Figure 2:
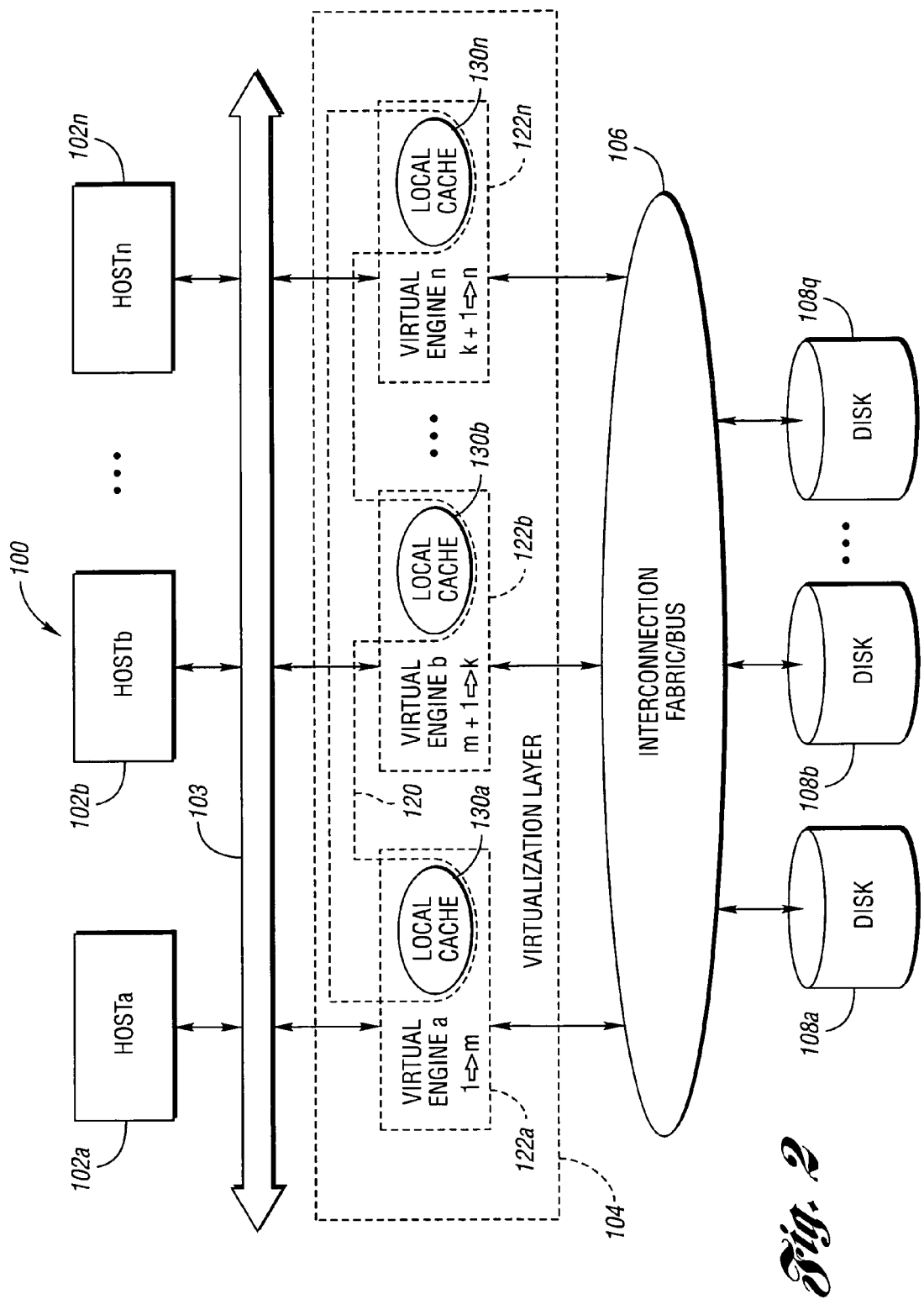
FIG. 2 is a diagram of a storage area network of the present invention.

Referring to FIG. 2, a diagram illustrating a storage area network (SAN) 100 in accordance with a preferred embodiment of the present invention is shown. The SAN 100 generally comprises at least one host 102 (e.g., hosts 102a-102n) coupled to a virtualization layer 104 using (i.e., through, via, etc.) a bus 103. The layer 104 may be coupled to an interconnection fabric/bus 106. The bus 106 may be coupled to at least one physical data storage device 108 (e.g., devices 108a-108q). In a preferred embodiment, the system 100 may be implemented having a single device 108. The devices 108 are generally implemented as disks such as hard disk drives. However, the devices 108 may be implemented as any appropriate number of appropriate storage device (e.g., magnetic, optical or solid state) to meet the design criteria of a particular application.

The virtualization layer 104 generally comprises a secondary cache 120 and at least one (generally a plurality of) virtual engine (VE) 122 (e.g., virtual engines 122a-122n). The VEs 122 generally correspond to the hosts 102. The number of virtual engines 122 can be implemented as the number of physical devices (or disks) 108, but is not necessarily equal to the number of devices 108 (i.e., the number n may or may not equal the number q and there may not be a one-to-one correspondence between the physical devices 108a-108q and the virtual engines 122a-122n). The secondary layer 120 generally comprises a coupling (i.e., combination, connection, etc.) of a number (generally a plurality) of local caches 130 (e.g., caches 130a-130n). Singularly (i.e., individually), the plurality of local caches 130 generally comprise a first layer cache in the SAN 100.

Figure 3:
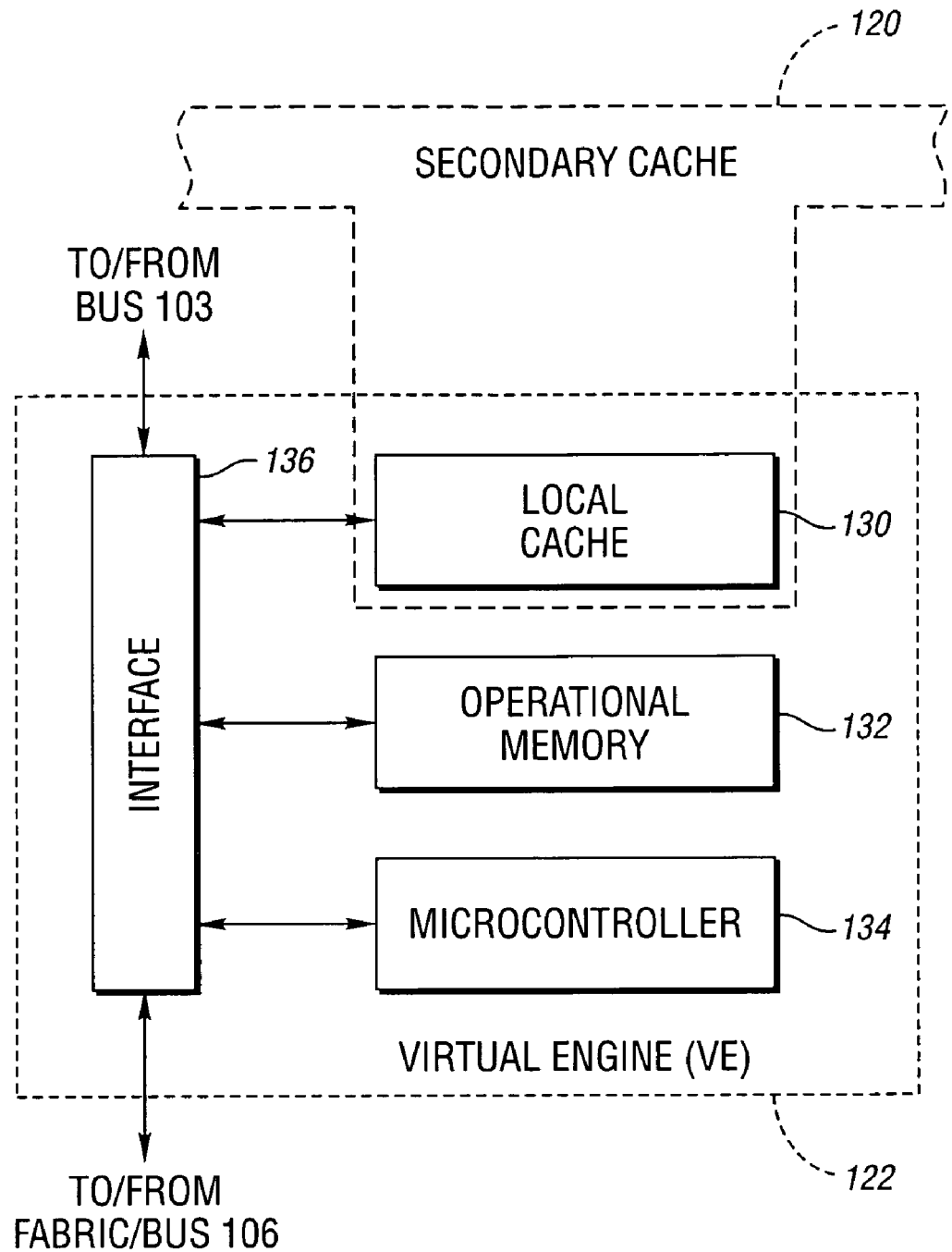
FIG. 3 is a detailed diagram of a virtual engine of the present invention.

Referring to FIG. 3, a detailed diagram of the VE 122 is shown. Each virtual engine 122 generally comprises a respective one of the local caches 130, an operational memory 132, a microcontroller 134, and interface hardware 136. The local cache 130 generally contains blocks of data. The operational memory 132 is generally configured to hold (or store) information and/or commands related to the operation of the VE 122. The microcontroller 134 generally controls the operation of the VE 122. The interface 136 generally couples the local cache 130, the memory 132, and the microcontroller 134 to the bus 103 and the bus 106 (i.e., the interface 136 may interconnect the VE 122 internally and externally).

The local caches 130 are generally implemented containing data (or information) from any of the physical devices 108. The local caches 130 are generally implemented as groups (e.g., sets, sections, portions, etc.) of data blocks. The groups of blocks that comprise the local cache 130 of the virtual engine 122 may be contiguous. In one example, the local cache 130a may comprise blocks 1 through m, the local cache 130b may comprise blocks (m+1) through k, and the local cache 130n may comprise blocks (k+1) through n. However, the local caches 130 may be implemented as any appropriate configuration and/or range to meet the design criteria of a particular application. Regardless of the configuration of the local caches 130, the system 100 (i.e., the respective microcontroller 134) generally monitors (i.e., determines, knows, tracks, etc.) the range (i.e., span, location, etc.) of block coverage (and respective addresses) of each of the local caches 130a-130n. In contrast, the secondary cache 120 covers the entire range of blocks 1 through n (i.e., all of the caches 130a-130n).

Figure 4:
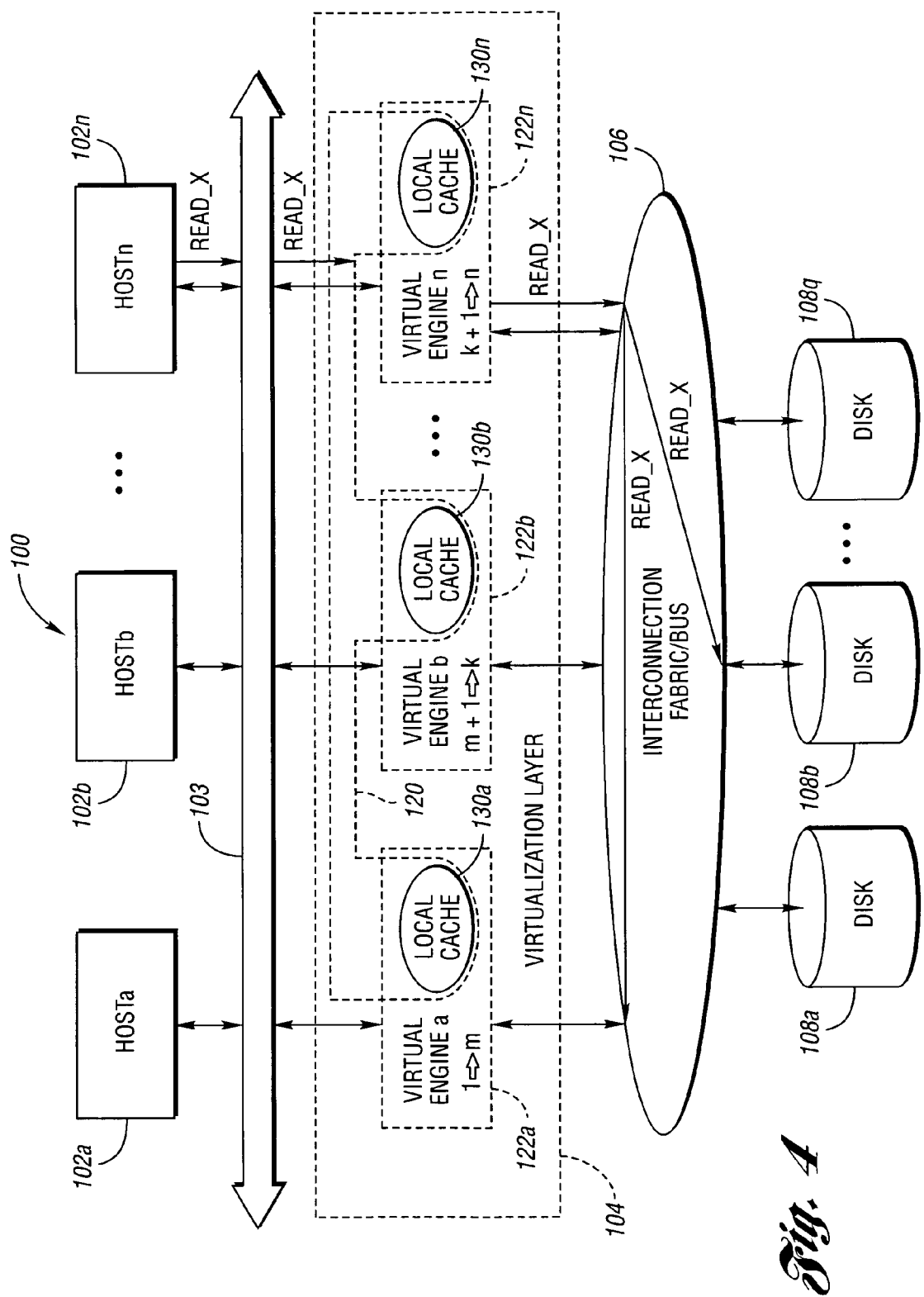
FIG. 4 is a diagram of a data transfer operation using the storage area network of FIG. 2.

Referring to FIG. 4, a diagram illustrating a read operation in connection with the SAN 100 of the present invention is shown. When a data transfer request (i.e., signal, command, etc.) (e.g.; READ_X) is presented by a host 102 (e.g., host 102n) to the respective virtual engine 122 (e.g., the virtual engine 122n), the virtual engine 122n may determine whether or not the requested data (i.e., the respective data block corresponding to the value X) is in the range that is covered by (e.g., corresponds to) the particular virtual engine 122 (i.e., for the example illustrated in FIG. 4, the virtual engine 122n). The value X generally corresponds to a block address of the data (or information) to be read.

When the block address X presented by the host 102n does not correspond to the set of blocks that are generally cached by the respective virtual engine 122n, the VE 122n simultaneously presents (i.e., sends, transmits, broadcasts, etc.) the READ_X command to the respective virtual engine 122 where information related to the block address is generally cached (in this case, the virtual engine 122a) and the at least one physical device (e.g., disk) 108 via a multicast operation through the bus 106 The more rapid responding device of either the device 108 and the virtual engine 122a that contains the appropriate data (i.e., the data that corresponds to the command presented by the host 102n, in the present case the data that corresponds to the address X) generally presents the appropriate data to the host 102n. The READ_X signal to the non-responsive one of the device 108 and the virtual engine 122 is generally cancelled (or aborted).

The SAN 100 generally reduces or eliminates delay associated with data transfer operations that include accessing a physical data storage device when compared with data transfer operations performed by conventional SANs such as the SAN 10. While a read operation is described in connection with FIG. 4, a host 102 may perform any appropriate request (i.e., command, operation, etc. such as transfer, write, write/read, read, and the like) is a manner similar to the read operation described in connection with FIG. 4.

Referring to FIG. 5, a flow diagram illustrating a read operation (e.g., process, routine, method, blocks, steps, etc.) 200 in accordance with the present invention is shown. The method 200 may be implemented in connection with the system 100. The method 200 is generally performed by at least one of the microcontrollers 134a-134n. However, the method 200 may be implemented in connection with any appropriate system (or SAN) and by any appropriate controller to meet the design criteria of a particular application.

In one example mode of operation, a host 102 (e.g., host 102n) may present (i.e., send, transmit, broadcast, etc.) a read request (e.g., signal, command, order, etc.) for a block of data having (or corresponding to) the block address X (e.g., the signal READ_X) to the layer 104 (block or step 202). The method 200 may determine whether the address X is generally cached by the virtual engine 122n (i.e., the method 200 may determine whether the value X is within the set of blocks cached by virtual engine 122n) (decision block or step 204).

When the address X corresponds to the set of blocks that are generally cached by the virtual engine 122n (i.e., the YES leg of the decision block 204), the process 200 generally determines whether the data corresponding to the block X is currently stored (i.e., cached, contained, located, etc.) in the respective virtual engine 122 local cache (i.e., the local cache 130n) (decision block or step 206). When the data corresponding to the block X is currently stored in the local cache 130n (or cached at the virtual engine 122n) (i.e., the YES leg of the decision block 206), process 200 may send (e.g., present, transfer, copy, etc.) the block X data (i.e., data from the respective section of the local cache 130n) to the host 102n (block or step 208). The process 200 may end (i.e., complete, stop, exit, etc.) (block or step 210).

Returning to the decision block 206, when the data corresponding to (or referenced in) the block X is not currently stored in the virtual engine 122n local cache 130n (i.e., the NO leg of the decision block 206), process 200 may read the data from the block X from the appropriate device (or disk) 108 (e.g., the disk 108b) (block or step 212). The process 200 may present the data from the block X in the disk 108b to the host 102n (block 208). The process 200 may end (block 210).

Returning to the decision block 204, when the address X does not correspond to the set of blocks that are generally cached by the virtual engine 122n in the local cache 130n (i.e., the NO leg of the decision block 204), the operation 200 (e.g., the microcontroller 134n) generally determines the respective virtual engine 122 that caches the data that corresponds to the address X in the respective local cache 130 (i.e., the block X) (block or step 214). In the example illustrated in FIGS. 4 and 5, the block X may be cached at the virtual engine 122a in the local cache 130a. However, the block X is generally cached at the appropriate local cache 130 of the virtual engine 122 to meet the design criteria of a particular application.

The method 200 presents (i.e., sends, transmits, broadcasts, etc.) the signal READ_X to the respective virtual engine 122 (e.g., the virtual engine 122a) and the physical devices (or disks) 108 via a multicast operation through the bus 106 (e.g., the signal READ_X) (block or step 216). The virtual engine 122n generally waits to receive the data that corresponds to the block X (block or step 218). When the data from the block X is not received, the method 200 generally continues to wait to receive the data from the block X (i.e., the NO leg of decision block or step 220).

When the data that is stored in the block X is received (i.e., the YES leg of decision block 220), the process 200 generally determines whether the data from the block X was received from the respective virtual engine 122 (e.g., the local cache 130a of the virtual engine 122a) (decision block or step 222). When the data from the block X is received from the virtual engine 122a (i.e., the YES leg of the decision block 222), the process 200 generally presents an ABORT command to the devices 108 (i.e., the process 200 may cancel the READ_X request that was presented to the devices 108) (block or step 224). The process 200 may present the received data to the host 102n (i.e., the block 208). The process 200 may end (i.e., the block 210).

When the data corresponding to the block X is not received from the local cache 130a of virtual engine 122a (i.e., the NO leg of the decision block 222), the data corresponding to the block X is generally received from a disk 108 (e.g., in the present case, the disk 108b). The method 200 may present an ABORT command to the virtual engine 122a (block or step 226) (i.e., the process 200 may cancel the READ_X request that was presented to the virtual disk 130a of the virtual engine 122a). The process 200 may present the received data to the host 102n and to the virtual engine 122a (for storing in the local cache 130a) through a multicast operation using (i.e., through or via) the bus 106 (block or step 228). The process 200 may end (i.e., the block 210).

While a read operation is described in connection with FIG. 5, the process 200 may perform any appropriate request (i.e., command, signal, operation, etc. such as transfer, write, write/read, read, and the like) is a manner similar to the read operation 200 described in connection with FIG. 5.

When the block address that corresponds to the command presented by a particular host 102 does not correspond to the set of blocks that are generally cached by the respective virtual disk 130 in the respective virtual engine 122 (i.e., the virtual engine 122 that corresponds to the respective host 102), the method 200 (i.e., a microcontroller 134) simultaneously presents (i.e., sends, transmits, broadcasts, etc.) the command to the respective virtual engine 122 where information related to the block address is generally cached and the at least one physical device (or disk) 108 via a multicast operation through the bus 106. The more rapidly responding of either the disk 108 and the virtual engine 122 that contains the appropriate data (i.e., the data that corresponds to the command presented by the host 102) generally presents the appropriate data to the host 102.

In contrast, a convention SAN approach (which lacks the secondary cache 120) first determines whether the respective virtual disk (e.g., a virtual disk implemented in a virtual device 16) where information related to the block address is generally cached contains the desired data. When the desired data is not found in the virtual disk, the conventional approach then presents the host (e.g., a host 12) command to the physical storage devices (e.g., the disks 20). As such, the conventional approach has an inherent latency (or time delay) when the block address that corresponds to the command presented by a particular host 12 does not correspond to the set of blocks that are generally cached by the respective virtual device 16. The present invention may reduce or eliminate the latency interval when compared to the conventional approach.

Furthermore, when the desired information is retrieved from a physical storage device 108 using the present invention, the desired data is generally multicast to both the host 102 that presented the request and the respective virtual engine 122 (i.e., local cache 130) using the bus 106. As such, the data may be available for retrieval from the respective virtual engine 122 in subsequent operations presented by a host 102, and subsequent operations may be performed more rapidly when compared to conventional approaches that do not provide the secondary cache of the present invention.

As is readily apparent from the foregoing description, then, the present invention generally provides an improved system and an improved method for a storage area network. The present invention may implement a secondary cache that may provide more rapid data transfer when performing a data transfer operation between a host 102 and a memory (e.g., a cache 130 and a device 108) where data corresponding to a command is stored. Since the improved SAN 100 of the present invention may provide more rapid data transfer when performing a data transfer operation between a host 102 and a memory where data corresponding to a command is stored, the overall SAN system performance may be improved when compared to conventional SAN implementations such as the SAN 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a storage area network (SAN), a method of transferring data, the method comprising:
   providing a host device in electronic communication with a virtualization layer, the virtualization layer having a plurality of virtual engines, each of the virtual engines logically embodying at least a controller and a respective local cache, wherein the respective local caches are in electronic communication such that the respective local caches comprise a secondary cache layer;
   receiving, at a controller logically embodied in a first virtual engine, a data transfer command from the host device;
   determining when a local cache logically embodied in the first virtual engine is responsible for caching a data block corresponding to the data transfer command;
   transferring the data block corresponding to the data transfer command to the host device when the local cache logically embodied in the first virtual engine is responsible for caching the data block and the data block is contained in the local cache logically embodied in the first virtual engine;
   identifying a second virtual engine logically embodying a local cache responsible for caching the data block corresponding to the data transfer command when the local cache logically embodied in the first virtual engine is not responsible for caching the data block, wherein the local cache logically embodied in the second virtual engine is a local cache of the secondary cache layer;
   multicasting the data transfer command to the second virtual engine and a physical device corresponding to the data block when the local cache logically embodied in the first virtual engine is not responsible for caching the data block; and
   determining which of at least one of the second virtual engine and the physical device responds first with the data block in response to multicasting the data transfer command.

2. The method of claim 1 further comprising transmitting the data block to the host device from the physical device in the event the physical device responds first with the data block.

3. The method of claim 2 further comprising transmitting an abort command to the second virtual engine in response to the physical device transmitting the data block to the host device such that the second virtual engine is no longer responsive to the data transfer command.

4. The method of 2 further comprising simultaneously transmitting the data block to the second virtual engine from the physical device such that the data block is available for later retrieval in subsequent operations performed by the host device.

5. The method of claim 1 further comprising transmitting the data block to the host device from the second virtual engine in the event the second virtual engine responds first with the data block.

6. The method of claim 5 further comprising transmitting an abort command to the physical device in response to the second virtual engine transmitting the data block to the host device such that the physical device is no longer responsive to the data transfer command.

7. A storage area network (SAN) system comprising:
   a host device; and
   a virtualization layer in electronic communication with the host device, the virtualization layer comprising:
      a plurality of virtual engines, each of the virtual engines logically embodying at least a controller and a respective local cache such that each of the local caches individually comprise a first cache layer; and
      a secondary cache layer comprising the respective local caches, wherein the respective local caches are electronically coupled together, wherein a controller logically embodied in a first virtual engine is configured to:
         receive a data transfer command from the host device,
         determine when a local cash logically embodied in the first virtual engine is responsible for caching a data block corresponding to the data transfer command,
         transfer the data block corresponding to the data transfer command to the host device when the local cash logically embodied in the first virtual engine is responsible for caching the data block corresponding to the data transfer command and the data block is contained in the local cache logically embodied in the first virtual engine,
         identify a second virtual engine logically embodying a local cache responsible for caching the data block corresponding to the data transfer command when the local cache logically embodied in the first virtual engine is not responsible for caching the data block, wherein the local cache logically embodied in the second virtual engine is a local cache of the secondary cache layer,
         multicast the data transfer command to the second virtual engine and a physical device corresponding to the data block and in electronic communication with the controller logically embodied in the first virtual engine when the local cache logically embodied in the first virtual engine is not responsible for caching the data block; and
         determine which of at least one of the second virtual engine and the physical device responds first with the data block for presentation to the host device.

8. The system of claim 7 wherein the controller logically embodied in the first virtual engine is further configured to receive the data block from the physical device in the event the physical device responds first with the data block.

9. The system of claim 8 wherein the controller logically embedded in the first virtual engine is further configured to transmit the data block received from the physical device to the host device.

10. The system of claim 9 wherein the controller logically embedded in the first virtual engine is further configured to transmit an abort command to the second virtual engine in response to the to host device receiving the data block such that the second virtual engine is no longer responsive to the data transfer command.

11. The system of claim 8 wherein the second virtual engine is configured to receive the data block from the host device such that the data block is available for later retrieval from the second virtual engine in subsequent operations performed by the host device.

12. The system of claim 7 wherein the controller logically embedded in the first virtual engine is further configured to receive the data block from the second virtual engine in the event the second virtual engine responds first with the data block.

13. The system of claim 12 wherein the controller logically embedded in the first virtual engine is further configured to transmit an abort command to the physical device in response to the to host device receiving the data block such that the physical device is no longer responsive to the data transfer command.

14. For use in a storage area network (SAN), a method of transferring data, the method comprising:

providing a host device in electronic communication with a virtualization layer, the virtualization layer having a plurality of virtual engines, each of the virtual engines logically embodying at least a controller and a respective local cache, wherein the respective local caches are in electronic communication such that the respective local caches comprise a secondary cache layer;

receiving, at a controller logically embodied in a first virtual engine, a data transfer command from the host device;

determining when a local cache logically embodied in the first virtual engine is responsible for caching a data block corresponding to the data transfer command;

transferring the data block corresponding to the data transfer command to the host device when the local cache logically embodied in the first virtual engine is responsible for caching the data block and the data block is contained in the local cache logically embodied in the first virtual engine;

identifying a second virtual engine logically embodying a local cache responsible for caching the data block corresponding to the data transfer command when the local cache logically embodied in the first virtual engine is not responsible for caching the data block, wherein the local cache logically embodied in the second virtual engine is a local cache of the secondary cache layer;

multicasting the data transfer command to the second virtual engine and a physical device corresponding to the data block when the local cache logically embodied in the first virtual engine is not responsible for caching the data block; and transmitting a first abort command to the second virtual engine in the event the physical device transmits and the host device receives the data block prior to the second virtual engine indicating that the second virtual engine contains the data block.

15. The method of claim 14 further comprising transmitting a second abort command to the physical device in the event the second virtual engine transmits and the host device receives the data block prior to the physical device indicating that the physical device contains the data block.

* * * * *

UNITED STATES PATENT AND TRADEMARK OFFICE
CERTIFICATE OF CORRECTION

| | | |
|---|---|---|
| PATENT NO. | : 7,437,511 B1 | Page 1 of 1 |
| APPLICATION NO. | : 11/334127 | |
| DATED | : October 14, 2008 | |
| INVENTOR(S) | : Thai Nguyen et al. | |

It is certified that error appears in the above-identified patent and that said Letters Patent is hereby corrected as shown below:

Column 8, Line 35, Claim 7:

Delete "cash" and insert -- cache --.

Column 8, Line 39, Claim 7:

Delete "cash" and insert -- cache --.

Signed and Sealed this

Sixth Day of January, 2009

JON W. DUDAS
*Director of the United States Patent and Trademark Office*